Figure 1:
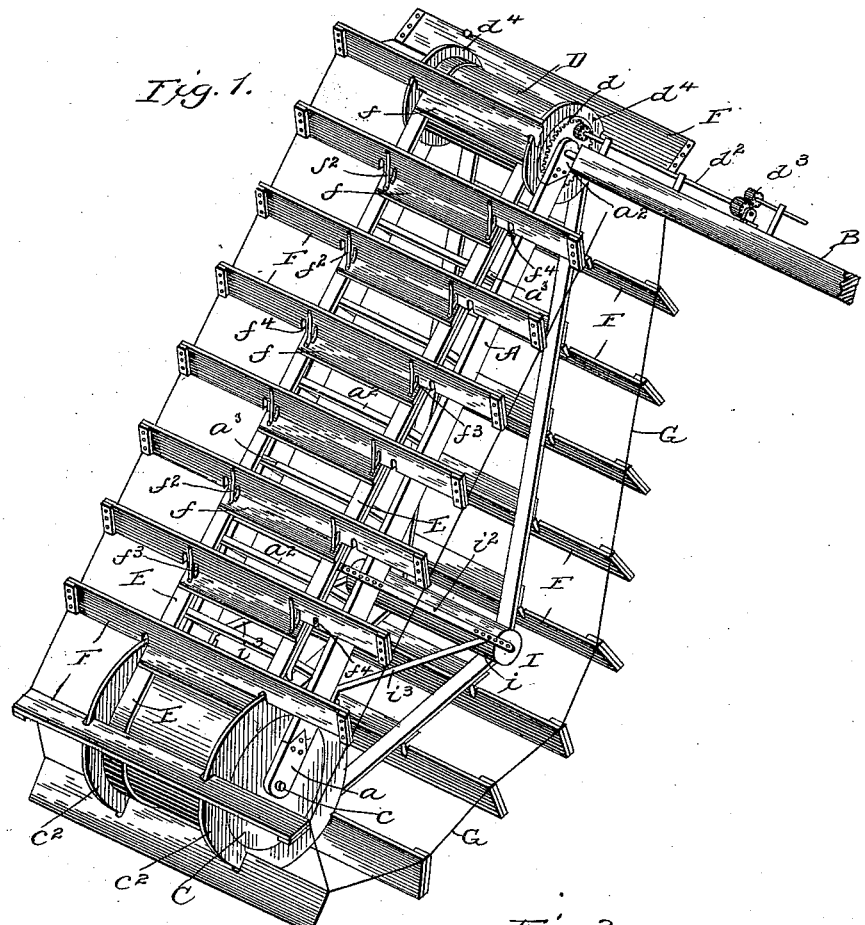

(No Model.)

O. A. PETTERSON.
CURRENT MOTOR.

No. 547,564. Patented Oct. 8, 1895.

Witnesses:
H. S. Rhur.
R. H. C. Elliott.

Inventor:
Oscar A. Petterson.
by R. S. Dyrenforth
his attorney.

UNITED STATES PATENT OFFICE.

OSCAR A. PETTERSON, OF CONTENTION, OREGON.

CURRENT-MOTOR.

SPECIFICATION forming part of Letters Patent No. 547,564, dated October 8, 1895.

Application filed March 16, 1895. Serial No. 542,052. (No model.)

*To all whom it may concern:*

Be it known that I, OSCAR A. PETTERSON, a citizen of the United States, residing at Contention, in the county of Gilliam and State of Oregon, have invented certain new and useful Improvements in Current-Motors; and I do hereby declare the following to be a full, clear, and exact description of the invention, such as will enable others skilled in the art to which it appertains to make and use the same.

This invention relates to current-motors.

The object of the invention is to provide a current-motor in which the power from running streams may be utilized to run machinery, raise water for irrigating purposes, and for other uses, such motor combining great simplicity in construction, high efficiency and durability in use, and cheapness of production; furthermore, to provide a current-motor constructed in such manner that it will automatically adjust itself to the varying heights of the stream over which it is suspended, thereby causing it to operate at all times, irrespective of the height of the stream; furthermore, to provide a current-motor having a float for supporting the lower end of the motor and also serving as a guide for the propelling-blades.

In a current-motor characterized by my invention I employ a frame suspended at its upper end by suitable means and furnish a float in the nature of a drum at its lower end, such drum being so proportioned with relation to the size and weight of the frame as to cause it to float the latter and hold it in operative position on the surface of the water. In addition to the lower drum I provide an upper drum, which may be provided with gears, by means of which power may be transmitted therefrom to any suitable piece of machinery to be driven. Around the two drums I place belts, preferably, in this instance, two in number, and to the belts I secure hinged leaves, with which the water contacts and thus causes the belts to revolve and thereby turn the upper drum to drive a piece of machinery, or by providing the leaves with suitable buckets or boxes to lift the water from the stream for irrigation or other purposes.

As a matter of further and specific improvement, I connect the inner edges of the outer ends of the leaves with an endless chain or belt whereby to brace them against strain.

Further and specific details of construction will be hereinafter fully described.

In the accompanying drawings, forming part of this specification, and in which like letters of reference indicate corresponding parts, I have illustrated one form of embodiment of my invention capable of carrying the same into effect.

Figure 2:
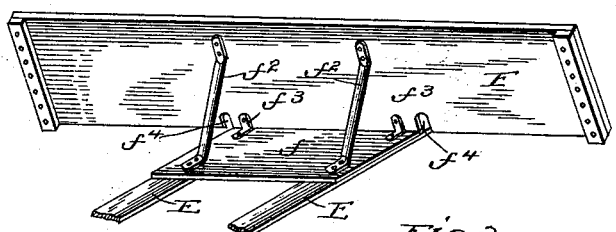
Figure 3:
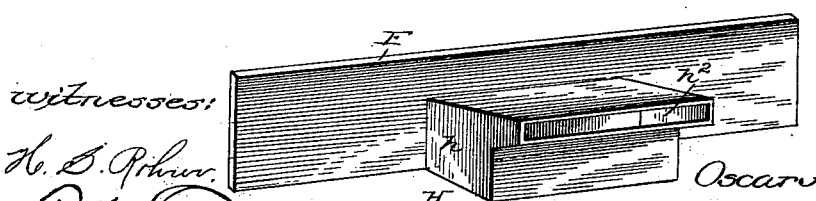

In the drawings, Figure 1 is a perspective view of a current-motor constructed in accordance with my invention, showing the same suspended over the bank of a stream with the lower drum in contact with the surface of the water. Fig. 2 is a similar view of one of the leaves detached from the blades and showing the peculiar manner of bracing the same; and Fig. 3 is a similar view of one of the leaves detached, showing the same provided with a bucket or water-box attachment.

Referring to the drawings, A designates a frame constructed in this instance of two parallel beams suitably pivoted upon the support B, holding it in position upon the bank of a stream. The beams A are provided at each end with plates $a$ and $a^2$, the latter plates forming journals for the support B and the former for the journals $c$ of the drum C. The drum C is, by preference, constructed of wood and is a hollow cylinder with the two ends closed by suitable means, thus providing a float. The upper drum D may be constructed similar to the lower drum, and is, by preference, of less diameter and is provided on its inner face or end with an internally-toothed gear $d$, from which motion is imparted to a piece of machinery or the like through the medium of a shaft $d^2$ and gear $d^3$. Around the two drums pass two endless belts E, which are held in place against lateral displacement on the drum by circumferential flanges $d^4$ and $c^2$, respectively. To the belts are attached a series of leaves F, preferably in the manner shown in Fig. 2, wherein a plate or base-support $f$ is provided, to which are attached stanchions $f^2$, the upper ends of which are suitably attached to the leaves. In addition to the stanchions $f^2$ angle-irons $f^3$ may be employed for further strengthening the connection between the belts and the leaves. The inner edge of each of the leaves is provided with two recesses $f^4$, which are adapted to be engaged by the flanges $d^4$ $c^2$ on the upper and the lower drum, respectively, thereby holding the leaves against lateral displacement and also serving to guide them in the proper direction. In order to brace the outer edges of the leaves from strain incident to the pressure of the water, these edges are connected by means of an endless cable or chain G, as clearly indicated in Fig. 1. Where the device is to be employed for the purpose of raising water for irrigating or other purposes, each of the leaves is provided with a box-like structure H, comprising two end pieces $h$ and a receptacle $h^2$, in which the water is carried upward and discharged into a trough, (not shown,) from whence it is led to the place of consumption. In order to keep the belts under proper tension at all times a tension device I is employed, comprising a roller $i$, journaled in brackets $i^2$. These brackets are held at the desired adjustment by means of brace-rods $i^3$. The frame is suitably braced against strain by means of brace-beams $a^3$, such braces being disposed in a manner best calculated to accomplish the purpose for which they are designed. It will be seen by reference to Fig. 1 that the support B is slightly inclined from its free end downward. This is done to cause the water from the buckets, when the motor is used for irrigating purposes, to be discharged into the trough or other conduit provided to convey the water from the motor to the place of use.

Having thus fully described my invention, what I claim, and desire to secure by Letters Patent, is—

1. A current motor comprising a frame, a drum at each end thereof, the lower one constituting a float, a series of belts passing around the drums, leaves carried by the belts, and means for placing the belts under suitable tension, substantially as described.

2. A current motor comprising a frame pivoted at its upper end to a suitable support, a drum journaled at each end of the frame, the lower one constituting a float, a series of belts passing around the drums, leaves carried by the belts, and means for placing the leaves under desired tension, substantially as described.

3. A current motor comprising a frame pivoted at its upper end to a suitable support, two drums carried by the frame, each provided with circumferential flanges at each end, belts passing around the said drums and held in place by said flanges, and leaves carried by the belts and having their inner faces provided with recesses for engaging a circumferential flange on the drums, substantially as described.

In testimony whereof I affix my signature in presence of two witnesses.

OSCAR A. PETTERSON.

Witnesses:
J. K. BARRY,
AUGUST ANDERSON.